(12) United States Patent
Rudolf et al.

(10) Patent No.: US 7,586,874 B2
(45) Date of Patent: Sep. 8, 2009

(54) WIRELESS COMMUNICATION METHOD AND APPARATUS FOR PROVIDING MULTIMEDIA BROADCAST SERVICES

(75) Inventors: Marian Rudolf, Montreal (CA); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 865 days.

(21) Appl. No.: 10/740,259

(22) Filed: Dec. 18, 2003

(65) Prior Publication Data

US 2004/0228301 A1 Nov. 18, 2004

Related U.S. Application Data

(60) Provisional application No. 60/469,957, filed on May 13, 2003, provisional application No. 60/452,642, filed on Mar. 6, 2003, provisional application No. 60/438,569, filed on Jan. 6, 2003.

(51) Int. Cl.
*H04W 4/00* (2009.01)
(52) U.S. Cl. ..................... 370/330; 455/3.06
(58) Field of Classification Search ....... 455/3.04–3.06, 455/450–454, 463–464, 3.01, 423, 429, 422.1; 370/321, 336–337, 347, 276, 281, 343, 330, 370/335, 468
See application file for complete search history.

(56) References Cited

U.S. PATENT DOCUMENTS 5,768,531 A 6/1998 Lin et al.
6,031,827 A * 2/2000 Rikkinen et al. ............ 370/330
6,128,483 A 10/2000 Doiron et al.
6,317,436 B1 11/2001 Young et al.
6,370,391 B1 4/2002 Lietsalmi et al.
6,519,461 B1 2/2003 Andersson et al.
6,594,241 B1 7/2003 Malmlof
6,594,252 B1 7/2003 Barany et al.
6,684,081 B2 1/2004 Sarkkinen et al.
6,760,303 B1 7/2004 Brouwer (Continued)

FOREIGN PATENT DOCUMENTS

EP 1 077 539 2/2001

(Continued)

OTHER PUBLICATIONS

"Multimedia Broadcast/Multi Service; Architecture and Functional Description", 3GPP TR 23.846 2.0.0, Sep. 2002, pp. 1-114.

(Continued)

*Primary Examiner*—Edward Urban
*Assistant Examiner*—Tu X Nguyen
(74) *Attorney, Agent, or Firm*—Volpe and Koenig, P.C.

(57) ABSTRACT

A system and method for configuring the system for configuring a wireless multi-cell communication to provide multimedia broadcast services (MBMS) to a plurality of wireless transmit/receive units (WTRUs). The cells of the communication system are organized into a plurality of sets of one or more cells. Resource units are assigned to each set of cells in the communication system. The assigned resource units are allocated in each cell of the communication system for MBMS transmission. The WTRUs receive information indicating how to access the resource units allocated for MBMS transmission. The WTRUs receive the MBMS from one or more of the cells of the communication system.

14 Claims, 6 Drawing Sheets

U.S. PATENT DOCUMENTS

| | | |
|---|---|---|
| 6,781,999 B2 | 8/2004 | Eyuboglu et al. |
| 6,795,419 B2 | 9/2004 | Parantainen et al. |
| 6,940,844 B2 | 9/2005 | Purkayastha et al. |
| 6,987,764 B2 | 1/2006 | Hsu |
| 7,031,694 B2 | 4/2006 | Koulakiotis et al. |
| 7,047,473 B2 | 5/2006 | Hwang et al. |
| 7,177,658 B2 | 2/2007 | Willenegger et al. |
| 7,181,759 B2 | 2/2007 | Oz et al. |
| 7,184,789 B2 | 2/2007 | Leung et al. |
| 7,212,824 B2 | 5/2007 | Terry |
| 7,313,593 B1 | 12/2007 | Pulito et al. |
| 2002/0116520 A1 | 8/2002 | Hayden et al. |
| 2003/0092376 A1 | 5/2003 | Syed |
| 2003/0099201 A1 | 5/2003 | Hu et al. |
| 2003/0134653 A1 | 7/2003 | Sarkkinen et al. |
| 2003/0157949 A1 | 8/2003 | Sarkkinen et al. |
| 2003/0174645 A1 | 9/2003 | Paratainen et al. |
| 2003/0174678 A1 | 9/2003 | Chang et al. |
| 2003/0194992 A1 | 10/2003 | Kim et al. |
| 2003/0207696 A1* | 11/2003 | Willenegger et al. ........ 455/522 |
| 2003/0211855 A1 | 11/2003 | Sarkkinen et al. |
| 2003/0217362 A1 | 11/2003 | Summers et al. |
| 2003/0223394 A1 | 12/2003 | Parantainen et al. |
| 2003/0224794 A1 | 12/2003 | Kim et al. |
| 2003/0231612 A1 | 12/2003 | Kim et al. |
| 2003/0232594 A1 | 12/2003 | Shaheen |
| 2004/0180675 A1 | 9/2004 | Choi et al. |
| 2004/0184471 A1 | 9/2004 | Chuah et al. |
| 2006/0166653 A1 | 7/2006 | Xu et al. |

FOREIGN PATENT DOCUMENTS

| | | |
|---|---|---|
| EP | 1 122 962 | 8/2001 |
| FR | 2 729 812 | 7/1996 |
| WO | 98/25422 | 6/1998 |
| WO | 00/07386 | 2/2000 |
| WO | 01/99454 | 12/2001 |

OTHER PUBLICATIONS

Mihailescu et al., "Dynamic Resource Allocation for UMTS TD-CDMA Systems", EPMCC, European Personal Communications Conference Together with ITG-Fachtagung, Kommunikation, 1999, pp. 179-184.

Aghadavoodi et al., "Improved Selective Repeat ARQ Schemes for Data Communication", 1994 IEEE Vehicular Technology Conference, Jun. 1994, pp. 1407-1411.

Mosko et al., "Performance of Group Communication Over Ad-hoc Networks", Seventh International Symposium on Proceedings Computers and Communications, Jul. 2002, pp. 545-552.

"MBMS Signalling Flows for UEs in Idle Mode" TSG-RAN WG2 #33, Nov. 15, 2002, pp. 1-3.

Jari Isokangas et al. "Multicast in UMTS—Advanced topics in broadband networks", Slide No. 18, Dec. 2, 2002.

Lusheng Ji et al. "Differential destination multicast—A MANET Multicast Routing Protocol for Small Groups" Proceedings IEEE Infocom 2001. The Conference on Computer Communications. 20th Annual Joint Conference of the IEEE Computer and Communications Societies. Anchorage, AK, Apr. 22-26, 2001, vol. 1 of 3, Conf. 20, Apr. 22, 2001, pp. 1192-1201.

Aghadavoodi et al., "A New ARQ Scheme for Multicast Satellite Communication," 3rd European Cenference on Satellite Communications, Manchester, UK, pp. 11-15, (1993).

"Multimedia Broadcast/Multi Service; Architecture and Functional Description", 3GPP TR 23.846 2.0.0 Sep. 2002, pp. 1-114.

Mihailescu et al., "Dynamic Resource Allocation for UMTS TD-CDMA Systems", EPMCC, European Personal Communications Conference Together with ITG-Frachtagung, Kommunikation, 1999, pp. 179-184.

Aghadavoodi et al., "Improved Selective Repeat ARQ Schemes for Data Communications", 1994 IEEE Vehicular Technology Conference, Jun. 1994, pp. 1407-1411.

Mosko et al., "Performance of Group Communication Over Ad-hoc Networks", Seventh International Symposium on Proceedings Computers and Communications, Jul. 2002, pp. 545-552.

"MBMS Signalling Flows for UEs in Idle Mode" TSG-RAN WG2 #33, Nov. 15, 2002, pp. 1-3.

Jari Isokangas et al. "Multicast in UMTS - Advanced topics in broadband networks", Slide No. 18, Dec. 2, 2002.

Lusheng Ji et al. "Differential destination multicast— A MANET Multicast Routing Protocol for Small Groups" Proceedings IEEE Infocom 2001. The Conference on Computer Communications. 20th Annual Joint Conference of the IEEE Computer and Communications Societies. Anchorage, AK, Apr. 22-26, 2001, vol. 1 of 3. Conf. 20, Apr. 22, 2001, pp. 1192-1201.

"MBMS Signalling Flows for UEs in Idle Mode" TSG-RAN WG2 #33, Nov. 15, 2002, pp. 1-3.

"Multimedia Broadcast/Multi Service; Architecture and Functional Description", 3GPP TR 23.846 2.0.0, Sep. 2002, pp. 1-114.

Aghadavoodi et al., "A New ARQ Scheme for Multicast Satellite Communication," 3rd European Conference on Satellite Communications, Manchester, UK, pp. 11-15, (1993).

Aghadavoodi et al., "Improved Selective Repeat ARQ Schemes for Data Communication", 1994 IEEE Vehicular Technology Conference, Jun. 1994, pp. 1407-1411.

Jari Isokangas et al. "Multicast in UMTS - Advanced topics in broadband networks", Slide No. 18, Dec. 2, 2002.

Lusheng Ji et al. "Differential destination multicast — a MANET Multicast Routing Protocol for Small Groups" Proceedings IEEE Infocom 2001. The Conference on Computer Communications. 2th Annual Joint Conference of the IEEE Computer and Communications Societies. Anchorage, AK, Apr. 22-26, 2001, vol. 1 of 3. Conf. 20, Apr. 22, 2001, pp. 1192-1201.

Mihailescu et al., "Dynamic Resource Allocation for UMTS TD-CDMA Systems", EPMCC, European Personal Communications Conference Together with ITG-Fachtagung, Kommunikation, 1999, pp. 179-184..

Mosko et al., "Performance of Group Communication Over Ad-hoc Networks", Seventh International Symposium on Proceedings Computers and Communications, Jul. 2002, pp. 545-552.

\* cited by examiner

WIRELESS COMMUNICATION METHOD AND APPARATUS FOR PROVIDING MULTIMEDIA BROADCAST SERVICES

CROSS REFERENCE TO RELATED APPLICATIONS

This application claims priority from U.S. provisional application Ser. No. 60/438,569, filed Jan. 6, 2003; U.S. provisional application Ser. No. 60/452,642, filed Mar. 6, 2003; and U.S. provisional application Ser. No. 60/469,957, filed May 13, 2003, which are incorporated by reference as if fully set forth.

This application is also related to co-pending U.S. application Ser. No. 10/739,497, filed on Dec. 18, 2003.

FIELD OF THE INVENTION

The present invention generally relates to wireless communications. More particularly, the present invention is directed to providing at least one or more Multimedia Broadcast Services (MBMS) in a wireless communication system, such as Time Division Duplex (TDD), Frequency Division Duplex (FDD), code division multiple access (CDMA) and/or Universal Mobile Telecommunications System (UMTS).

BACKGROUND

The third generation partnership project (3GPP) wideband CDMA (W-CDMA) system is outlined in the operational scenarios for UMTS releases R99/R4 and R5. This system utilizes TDD and FDD modes and employs multiple common and dedicated channels for establishing a communications link. The Downlink (DL) common channels include at least one primary common control physical channel (P-CCPCH) containing the BCH (broadcast channel) and/or at least one secondary common control physical channel (S-CCPCH) containing a forward access channel (FACH).

The communications link is typically established using a wireless transmit/receive unit (WTRU). A WTRU includes but is not limited to a user equipment, mobile station, fixed or mobile subscriber unit, pager, or any other type of device capable of operating in a wireless environment. These exemplary types of wireless environments include, but are not limited to, wireless local area networks and public land mobile networks. The WTRUs described herein are capable of operating in a time slotted mode or a frequency divided mode such as TDD and FDD respectively. A "base station" includes but is not limited to a Node B, site controller, access point or other interfacing device in a wireless environment.

It is known that link performance at the cell edge of a multi-cell wireless communication system has long been a concern, particularly for common channels. Link analyses have shown that a wireless WTRU on the cell edge will have block error rates (BLERs) above 10% or even higher under certain fading conditions. In addition, for optimization of capacity, it might be desirable to locate an S-CCPCH in the same slot as the P-CCPCH.

A special class of services offered by network operators and carried by S-CCPCHs will be MBMS. In wireless communication systems, MBMS are used to efficiently distribute a common data service to multiple subscribers.

MBMS differ from classic point-to-point (PtP) services such as speech or bi-directional video-conferencing, in that a group of users are intended receivers of the same message sent by the network. Realization of MBMS therefore differs from PtP services in that the latter are usually sent over user-dedicated physical channels, whereas the former are more appropriate to be sent on common physical channels to be received by multiple WTRUs. The requirements for MBMS in terms of data rate vary in the range of up to around 100 kbps, but the most common requirement indicates demand for MBMS at around 64 kbps per cell, and 90% of users in the cell covered by the MBMS.

The fundamental problem with providing MBMS in a CDMA system is that unless dedicated channels are used, it is difficult to subject the physical channel carrying MBMS to power control. Accordingly, the base station transmit power must be set such that the user of the MBMS located most distant from the base station in the serviced group can reliably receive the physical channel. In essence, the base station must support the possibility that some user in the group of N MBMS users is at the cell edge and, therefore, the transmit power is set according to that user's needs. However, for most of the users this power is far more than sufficient. This creates a disproportionate amount of interference to other users in the same and neighboring cells.

By way of example, preliminary studies for wideband W-CDMA FDD show that in order to achieve coverage of more than 90% of the WTRUs in a representative FDD cell with the 64 kbit/second MBMS, typically around 30% of the base station power would be required with MBMS sent on the physical channel. Also, it is noted that it is extremely difficult to service MBMS users at cell edge at sustainable data rates.

Therefore, there is need for reducing such a large resource demand. To this end, several schemes for reducing the required power fraction for the MBMS have been discussed to improve link performance of the MBMS channel. These include: 1) longer interleaving, i.e., longer transmission time intervals (TTIs) with better time diversity, 2) transmit diversity for the MBMS channel, and 3) improved channel coding. Using such techniques, the power fraction of an FDD base station required for supporting the example 64 kbit/sec MBMS could be reduced from 30% to around 10-20%.

For UMTS narrowband TDD (NTDD) (1.28 Mcps option), the high interference levels created by the MBMS may be mitigated in the physical channel timeslots (TS) by exploiting frequency reuse. This is possible in principle because of the smaller bandwidth per NTDD carrier. For example, three narrowband carriers can be supported within the 5 MHz spectrum allocation of FDD or wideband TDD (WTDD).

Using this scheme, some cells would transmit MBMS in a particular timeslot, $TS_n$, on a frequency f1, a second group in $TS_n$ but on a frequency f2, and a third group in TSn but on a frequency f3. Because of the longer distance between two base stations sending MBMS in the same TS on the same frequency, more spatial separation is achieved, and therefore, less interference coming from the MBMS TS is created to other cells. However, an operator must have these three frequencies available in the deployment area. Techniques to reduce transmit (Tx) power requirements include, for example, usage of longer TTI lengths, soft handover and Tx diversity.

As a result of the previous discussions for universal terrestrial radio access (UTRA) FDD, a reduction down to some 15-20% base station DL Tx power is indicated for supporting 64 kbit/sec reference MBMS on S-CCPCH.

Previous systems disclose the implementation of an R4-based LCR TDD system in a deployment area with 3 low chip rate (LCR) carriers in a 5 MHz bandwidth and mapping the MBMS in this system onto an S-CCPCH contained in a single timeslot and assuming a frequency reuse factor 3 for this timeslot. These results show that LCR TDD can provide MBMS up to 64 kbps at a block error rate=10%

(BLER=10%) or around 16-32 kbps at BLER=1% could be supported when using full base station Tx power in the S-CCPCH timeslot.

Furthermore, in a prior art communication system using a time-domain reuse factor of 3, cells in set 1 would transmit their MBMS in $TS_n$, cells in set 2 would transmit their MBMS in $TS_{n+1}$ and sets in cells in set 3 would transmit their MBMS in $TS_{n+2}$. Cells in set 1 do not use $TS_{n+1}$ and $TS_{n+2}$ for any transmission, both uplink (UL) and DL, cells in set 2 do not use $TS_n$ and $TS_{n+2}$ for any transmission and so on. This method works irrespective of the duration of the MBMS data block, (i.e., is independent from its TTI). The average MBMS data rate yielded per cell with this method is 170 kbps/cell and the timeslot efficiency on MBMS TSs in the system is 170 kbps/3 TSs=56 kbps/TS.

Figure 1:
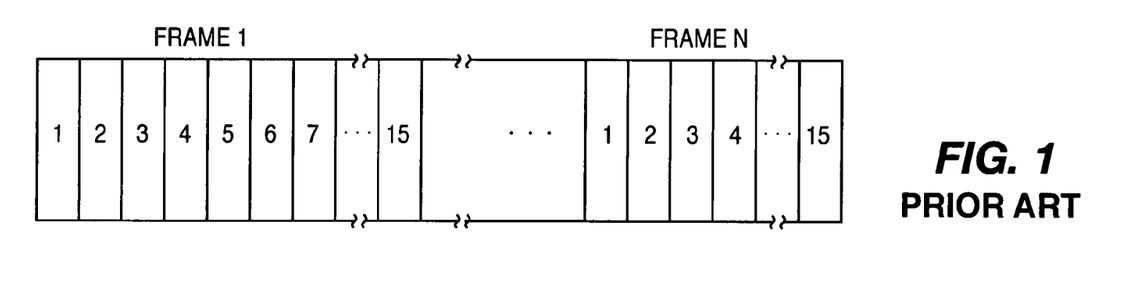
FIG. 1 illustrates an exemplary data frame sequence used in a prior art communication system in which one frame holds fifteen timeslots.

FIG. 1 shows an exemplary data frame sequence used by the above-mentioned prior art communication system, whereby a data frame is divided into TSs 1-15. The frames repeat and the TS assignments remain the same for subsequent frames until the TS is cleared or is specifically reassigned. Each timeslot is potentially assigned a predetermined number of frames.

Figure 2:
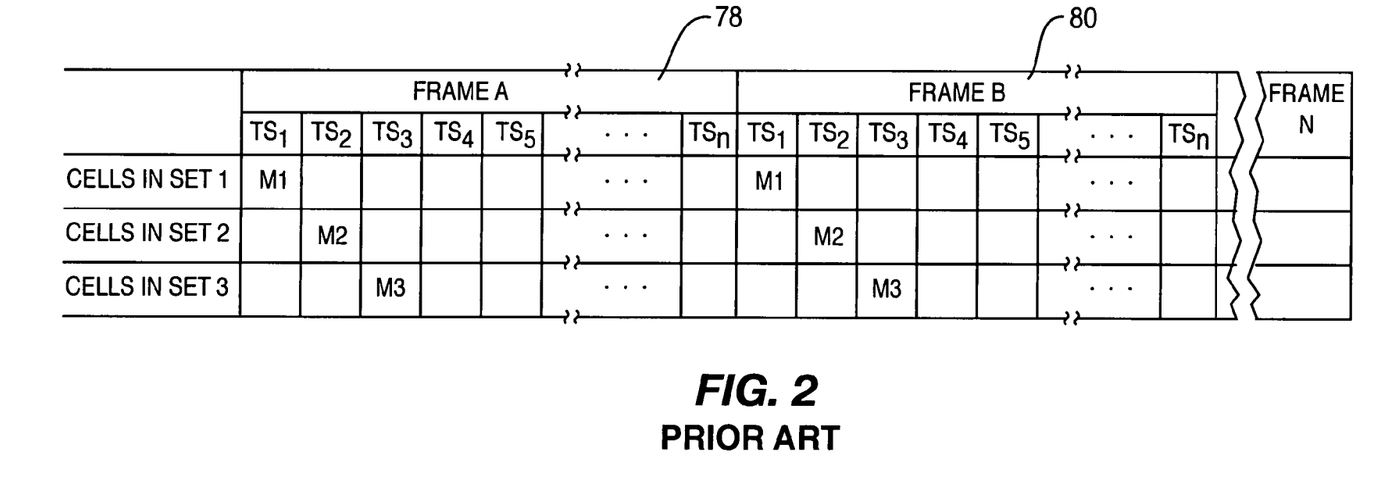
FIG. 2 is a diagram showing channel assignments used in a prior art communication system in which unique timeslots are applied to cells in different sets.

FIG. 2 is a diagram showing channel assignments used by the above-mentioned prior art communication system. Cells in different sets are assigned different timeslots. This arrangement is used when MBMS broadcasts are transmitted from multiple sources which may have overlapping coverage areas.

To illustrate, WTRU M1 in $TS_1$ is assigned codes corresponding to cells in a first set (set 1). WTRU M2 in TS 2 is assigned codes corresponding to cells in a second set (set 2), and WTRU M3 in TS 3 is assigned codes corresponding to cells in a third set (set 3). This appears in Frame A and repeats for subsequent frames until one or more of the assignments are changed.

Still referring to FIG. 2, in Frame A 78, the set 1 cells are assigned a first set of timeslots $TS_1$. The remainder of the timeslots $TS_2$-$TS_n$ is not used by set 1. The physical channel assignment for set 1 is the entire S-CCPCH. The set 2 cells are assigned a second set of timeslots $TS_2$. The remainder of the timeslots $TS_1$ and $TS_3$-$TS_n$ are not used by set 2. The physical channel assignment for set 2 is the entire S-CCPCH. The set 3 cells are assigned a third set of timeslots $TS_3$. The remainder of the timeslots $TS_1$-$TS_2$ and $TS_4$-$TS_n$ are not used by set 3. The physical channel assignment for set 3 is the entire S-CCPCH. This pattern repeats for Frame B 80, with corresponding timeslots $TS_1$-$TS_3$ assigned to the cells in the different sets.

Note that the drawback of the above-mentioned prior art communication system is that the timeslots $TS_1$, $TS_2$ and $TS_3$ cannot be used for other transmissions. Thus, if a timeslot is used for cells in one set, that timeslot may not be used for cells in another set. It would be desirable to have a set of TDD cells that are able to share a time-domain reuse pattern.

For proper application of radio resources, the Universal Terrestrial Radio Access Network (UTRAN) tracks the number of active MBMS users. Within each cell, for each MBMS the number of active users is used to determine the type of transport and physical resources applied to the MBMS, and when to initiate and terminate the MBMS in each cell.

Services are established as a result of MBMS activation and subscriber mobility. The mechanism envisioned to track MBMS users incorporates Radio Resource Control (RRC) layer 3 signaling for MBMS "joining" (service activation) and cell update procedures to maintain the subscribers' location. With these tools it is possible to know which users have activated the service and in which cell the service needs to be distributed.

Due to application of closed loop power control and transmit diversity, dedicated channels are more efficient when the number of users of a particular one of MBMS is small. When the number of users increases, the dedicated channel efficiency gains do not compensate for the duplication of each data stream, and common channels that provide a single data stream to multiple subscribers are used. This method is known as transport/physical channel switching and may be applied at anytime during an MBMS transmission.

When common channels are used, it is not practical to apply ARQ techniques ensure successful delivery. Therefore each MBMS transmission is repeated to increase the probability of successful delivery. The number of retransmissions takes into account the expected BLER of the transport and physical resources applied to the service.

MBMS are transmitted several times to better ensure successful delivery. The number to retransmissions is relative to the expected channel quality. This number will take into account a worst case scenario to achieve an expected Quality of Service (QoS). One example of this is when subscribers are located at the cell edge and as a result there is a high BLER. Often subscribers will experience better radio propagation conditions and will achieve successful delivery well before the retransmissions complete.

In summary, several improvements are desired to overcome deficiencies associated with conventional MBMS are desired. Firstly, there is a need for a new scheme which supports UMTS WTDD and NTDD, and also increases the capacity of common channels for offering MBMS. Secondly, a system for improving resource efficiency using performance enhancing techniques is desired whereby a set of TDD cells are configured to share a time-domain reuse pattern. Thirdly, no explicate service delivery indication exists so that any subscriber that has activated the MBMS will be billed for reception. Therefore, it would be desired for the UTRAN to provide a sufficient number of retransmissions to ensure reliable reception.

SUMMARY

The present invention is implemented in a wireless multi-cell communication system which includes at least one network in communication with one or more WTRUs. The communication system controls the distribution of MBMS from the network to the WTRU.

In one embodiment, the distribution of the MBMS is implemented by organizing the cells of the communication system into a plurality of sets of one or more cells, assigning resource units to each set of cells in the communication system, and allocating the assigned resource units in each cell of the communication system for MBMS transmission. The WTRUs receive information indicating how to access the resource units allocated for MBMS transmission, and the WTRUs receive MBMS from one or more of the cells of the communication system.

Prior to implementing the process described above, MBMS requirements may be established for the communication system and resource units may be determined for each cell in the communication system that are available for MBMS. The process may repeat when there is a change in the MBMS requirements or the MBMS requirements cannot be fulfilled.

The communication system may be an FDD communication system whereby multi-frame allocations may be used. A repetition period may be established for all of the cells in the communication system. Furthermore, a subset of frames may be established to be used for MBMS transmission per repetition period for each of the sets of cells.

The communication system may be a TDD communication system whereby a determination of whether to use multi-frame allocations in the communication system may be made. When it is determined to use multi-frame allocations in the TDD communication system, a repetition period may be established for all of the cells in the communication system. Furthermore, a subset of frames may be established to be used for MBMS transmission per repetition period for each of the sets of cells. When it is determined not to use multi-frame allocations, different combinations of timeslots may be provided for each set of cells, wherein the same combination of timeslots in each frame is used.

BRIEF DESCRIPTION OF THE DRAWING(S)

A more detailed understanding of the invention may be had from the following description of preferred embodiments, given by way of example and to be understood in conjunction with the accompanying drawings wherein.

DETAILED DESCRIPTION OF THE PREFERRED EMBODIMENT(S)

The present invention will be described with reference to the drawing figures wherein like numerals represents like elements.

Although the present invention has been described in conjunction with TDD and FDD type wireless communication systems, it is important to note that the present invention may be implemented in any type of wireless communication system including TD-SCDMA and CDMA 2000.

Figure 3:
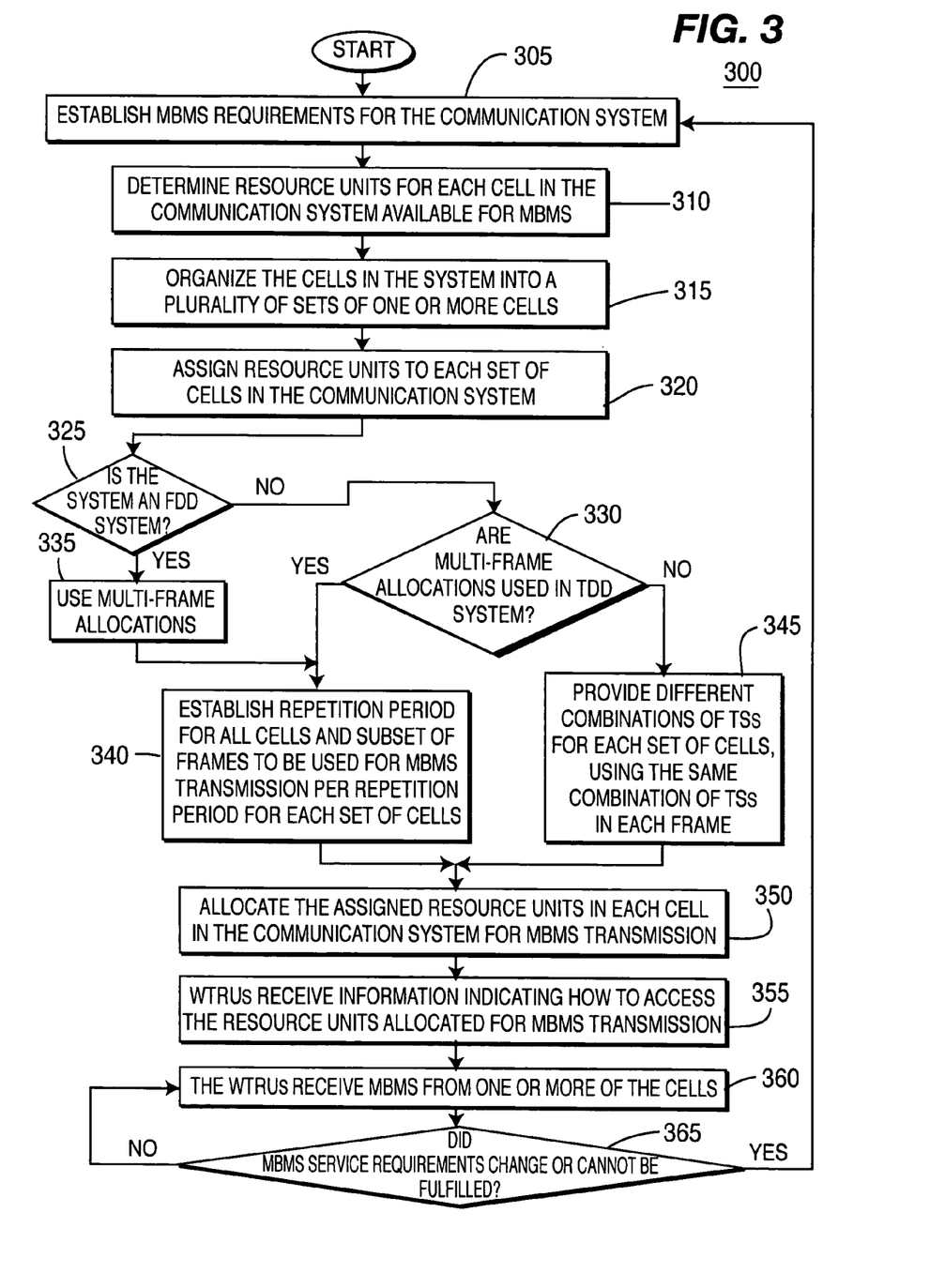
FIG. 3 is a flow chart showing the allocation of MBMS services to cells in a TDD or FDD wireless multi-cell communication system according to one embodiment of the present invention.

FIG. 3 is a flowchart showing the steps implemented by a process 300 for distributing MBMS from a network (e.g., UTRAN) of a wireless multi-cell TDD or FDD communication system to one or more WTRUs in accordance with one embodiment of the present invention. In step 305, a determination is made as to what MBMS requirements are to be established for the communication system. The MBMS requirements may define channel allocation parameter specifications such as data rate, target BLER, TTI and/or the minimum number of users, or the like.

In step 310, the required resource units for each cell in the communication system are determined based on their availability to be allocated to the MBMS. For a TDD communication system, the resource units may include physical channels which are defined by a specific carrier frequency, scrambling code, an optional channelization code and a set of frames. As specified by TS25.221, a physical channel in TDD is a burst, which is transmitted in a particular timeslot within allocated radio frames. The allocation can be continuous, (i.e., the time slot in every frame is allocated to the physical channel), or the allocation can be discontinuous (i.e., the time slot in a subset of all frames is allocated only. For an FDD communication system, the resource units may include physical channels which are defined by a specific carrier frequency, scrambling code, an optional channelization code and a start and stop time for a given duration. In step 315, the cells are organized into a plurality of sets (i.e., groups) of one or more cells in order to guarantee a certain level of the MBMS. In step 320, the resource units are assigned to each set of cells in the communication system.

In step 325, if an FDD communication system is used to perform the process 300, then multi-frame allocations are used in step 335. If a TDD communication system is selected to perform the process 300, a determination of whether to use multi-frame allocations is made in step 330. The use of multi-frame allocations may be based on the spatial separation (i.e., distance) between the cells. When multi-frame allocations are used in either an FDD communication system (step 335) or in a TDD communication system (as indicated by the YES output of step 330), interference in the communication system is minimized such that a certain service level of MBMS may be guaranteed by establishing a repetition period for all of the cells and a subset of the frames to be used for MBMS transmission per repetition period for each set of cells (step 340). If, in the TDD communication system, it is determined not to use multi-frame allocations, different combinations of TSs are provided for each set of cells, using the same combination of TSs in each frame (step 345). It should be understood that the decision of step 330 may be implemented independently or in conjunction with any one of the previous steps 305, 310, 315, 320.

In step 350, the assigned resource units are allocated in each cell in the communication system for MBMS transmission. In step 355, the WTRUs receive information indicating how to access the resource units allocated for MBMS transmission. In step 360, the WTRUs receive MBMS from one or more of the cells. In step 365, a determination is made as to whether the MBMS requirements determined in step 305 are unchanged and still fulfilled. If the MBMS requirements have not change and are still fulfilled, the process 300 loops back to step 360 where the WTRUs continue to receive MBMS. If the MBMS requirements change or are not fulfilled, the process 300 loops back to the beginning of process 300 at step 305, such that new MBMS requirements can be established.

According to the present invention, timeslot management is used to reduce inter-cell interference, whereby timeslots are assigned to particular frames and frames are assigned to cells in an advantageous manner. The timeslot management allows each set of cells within a group of cells to maintain optimum power. For TDD, the timeslot management insures that WTRUs receiving DL signals experience minimum interference from other cells in these timeslots. They can successfully decode received DL data on these channels, minimizing a need for retransmissions and insuring coverage for high data rates on these channels in the cell area. This is accomplished by assigning channel assignments and timeslots to the WTRU in such a manner that sets of cells are divided into groups, and each set of cells has a unique set of timeslot assignments.

The present invention implements a time-domain reuse pattern on a wireless communication system having a plurality of cells to support MBMS services. The effect of time-domain reuse and frequency reuse to improve reception quality are the same. In accordance with the present invention, the time-domain reuse pattern ensures that some cells in the TDD deployment area will transmit their MBMS services in certain timeslots, which are left unused by other cells.

The TDD aspect of the present invention applies to the case of conventional S-CCPCHs or DL shared channels in UMTS TDD R99 (3.84 Mcps and 1.28 Mcps option) and beyond independent of a specific content (such as MBMS) carried by it, but reliable service for MBMS is regarded as a very important special case. Even without MBMS, the inventive techniques will improve data rates and coverage achievable at cell edge. Without loss of generality, the case of MBMS sent on S-CCPCH is considered; even if the applicability of the method extends to any kind of service sent on any form of DL common channel, (such as a DL Shared Channel). R5 introduces another type of DL common channel for both FDD and TDD, i.e., the HS-DSCH.

The effect of implementing the inventive channel assignment techniques can be demonstrated by results derived from WTDD simulations. A data rate of approximately 2 Mbps per WTRU in the DL can is achieved by sending it data in 12 DL timeslots each filled with 16 spreading codes of SF=16. A single timeslot, using all 16 SF=16 spreading codes yields therefore a data rate of around 170 kbps if continuously sent every frame. In all the following examples, it is presumed for simplicity that 1 full timeslot per frame is assigned to the S-CCPCH or, equivalently to the MBMS. Also, 170 kbps per slot is presumed.

In accordance with the present invention, the timeslots are assigned in a manner which reduces interference which may occur when broadcasting MBMS broadcasts and other broadcasts in overlapping coverage areas. Timeslots are reused according to the requirements of MBMS within the cells. This is performed irrespective of the duration of the MBMS data block and is independent from TTIs.

In accordance with the present invention, if the same TS is used by all cells, the use of multi-frame allocations and TTIs can be exploited successfully. Within each predetermined group of sets of cells, the cells in each set are assigned unique sets of S-CCPCHs.

In accordance with the present invention, possible combinations of timeslots are reused, in accordance with their repetition periods. This establishes a time-domain reuse pattern. If the same TS is to be used by all cells, the use of multi-frame allocations and TTIs can be exploited successfully. With a TTI=20 ms (2 frames) per MBMS data block, a S-CCPCH per cell can be allocated with repetition period of 80 ms (8 frames).

A first set of cells would transmit its MBMS in a given timeslot n in frame m and m+1 and not transmit anything in timeslot n in frames m+2, . . . ,m+7. A second set of cells would transmit its MBMS in the same timeslot n, but in frame m+2 and m+3, but not transmit anything in timeslot n in frames m, m+1 and m+4, . . . ,m+7. A third set of cells would transmit its MBMS in the same timeslot n, but in frame m+4 and m+5, but not transmit anything in timeslot n in frames m, . . . ,m+3 and m+6, . . . ,m+7. Finally, a fourth set of cells would transmit its MBMS in still the same timeslot n in frames m+6 and m+7, but nothing in frames m, . . . ,m+5.

The average MBMS data rate yielded per cell with this method is 170 kbps/4=42 kbps/cell and the efficiency of MBMS TSs in the system is 170 kbps/1 TS=170 kbps/TS. The system will experience an effective time-domain reuse factor of 4 and practically no interference on the MBMS TSs. In Table 1 below, "n" denotes "a cell sends a S-CCPCH carrying MBMS in timeslot n in this frame". No "n" implies that the cell sends nothing in this frame in this timeslot n.

TABLE 1

| Frame number | m | m + 1 | m + 2 | m + 3 | m + 4 | m + 5 | m + 6 | m + 7 |
|---|---|---|---|---|---|---|---|---|
| Cells in set 1 | n | n | | | | | | |
| Cells in set 2 | | | n | n | | | | |
| Cells in set 3 | | | | | n | n | | |
| Cells in set 4 | | | | | | | n | n |

This process generalizes to other possible combinations like 1 MBMS TS, repetition period 40 ms with TTI=10 ms or 1 MBMS TS, repetition period 160 ms and TTI=40 ms.

Note that a time-domain reuse factor of 3 is frequently used in prior art communication systems and may be a highly attractive choice. This is achievable in this concept by using a repetition period 60 ms with TTI=20 ms. From the perspective of the physical layer, this is a straightforward variation. There is a minor modification to the higher layer protocols, which currently only support standardized repetition periods of 10, 20, 40, 80, 160, 320 and 640 ms. This time-domain reuse pattern would potentially yield an average MBMS data rate per cell of 170 kbps/3=56 kbps/cell. Only one "free" TS is necessary to accommodate the MBMS with this process.

In accordance with the present invention, a time-domain reuse of 2 is achieved, with a potential for 170/2=85 kbps. If the same single TS is to be used by all cells for MBMS, then with a repetition period of 40 ms, but a varying TTI per cell set, the use of multi-frame allocations and TTIs can be exploited successfully. In the Table 2 below, 'n' denotes that a cell set sends an S-CCPCH carrying MBMS in timeslot n in this frame. No 'n' means that the cell set sends nothing in this frame in this timeslot n.

TABLE 2

| Frame number | m | m + 1 | m + 3 | m+ 4 |
|---|---|---|---|---|
| Cells in set 1 | n | n | | |
| Cells in set 2 | | | n | n |
| Cells in set 3 | | n | n | |
| Cells in set 4 | n | | | n |
| Cells in set 5 | n | | n | |
| Cells in set 6 | | n | | n |

Note that cells in sets 1-4 allow for TTI=20 ms (achieved by means of using the "offset" parameter when doing the multi-frame allocations). Cells in sets 5 and 6 do not support transmission in two consecutive slots. As a result, cells in sets 5 and 6 are assigned time-separated TSs. It can be seen that each set of cells has at least one slot where there is no intercell interference from any particular other set. Furthermore, three pairs can operate with one another with no intercell interference:

(1) set 1 and set 2;
(2) set 3 and set 4; and
(3) set 5 and set 6.

Taking advantage of the redundancy in forward error correction (FEC), successful operation is possible over most regions, while supporting up to 85 kbps and requiring only one slot per frame.

Node B sync is handled by assigning fractional usage of the time slots. In this way, it is possible to support Node B sync using the sync bursts. This approach was originally rejected using prior art methods because of concerns that interference levels would prevent reliable detection. However, with the present invention, it is now much more feasible for a cell to listen to neighboring cells' sync bursts during slots in which the cell is not transmitting.

Figure 4:
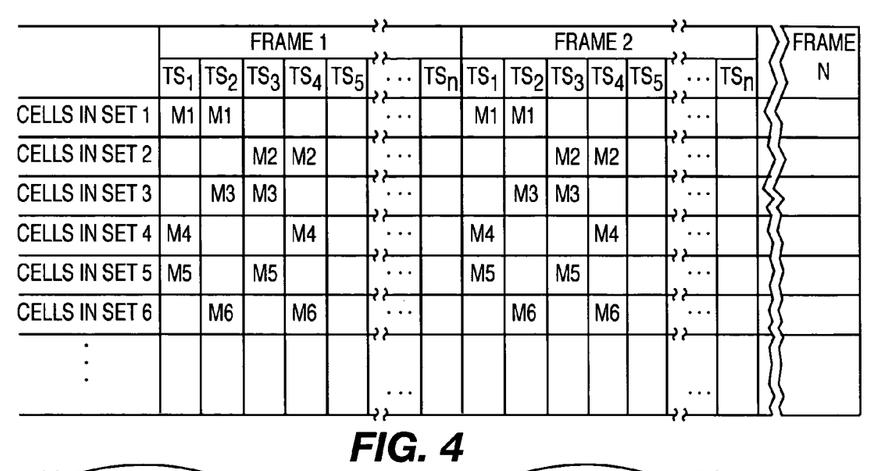
FIG. 4 is a diagram showing an example of implementing time-domain reuse in a TDD communication system in which cells in different sets share timeslots with cells in other sets but unique combinations of the timeslots are applied to cells in different sets according to the present invention.

FIG. 4 is a diagram showing channel assignments used in a TDD communication system using multi-frame assignments in accordance with the present invention. FIG. 4 provides an example of implementing time-domain reuse using a combination of both different TSs and frames assigned to cells. This modified technique is capable of overlapping assignments. Within each predetermined group of sets of cells, the cells in each set are assigned unique sets of S-CCPCHs. However, unlike in FIG. 2, the present invention presents an overlap between the sets of S-CCPCHs.

As shown in FIG. 4, the set 1 cells are assigned a first set of timeslots $TS_1$, $TS_2$ in each of the frames. The remaining timeslots $TS_3$-$TS_n$ are not used by set 1. The physical channel assignment for set 1 is the entire S-CCPCH. The set 2 cells are assigned a second set of timeslots $TS_3$, $TS_4$ in each of the frames. The remainder of the timeslots $TS_1$-$TS_2$ and $TS_5$-$TS_n$ are not used by set 2. The physical channel assignment for set 2 is the entire S-CCPCH. The set 3 cells are assigned a third set of timeslots $TS_2$ and $TS_3$ in each of the frames. The remainder of the timeslots $TS_1$ and $TS_4$-$TS_n$ are not used by set 3. The physical channel assignment for set 3 is the entire S-CCPCH. Timeslots assigned to set 3 overlap with the timeslots assigned to set 1 and set 2.

Referring still to FIG. 4, bringing in sets 4, 5 and 6 presents an overlap of timeslots as well as a time separation of timeslots within a given frame. The set 4 cells are assigned a fourth set of timeslots $TS_1$, $TS_4$ in each of the frames. The remainder of the timeslots $TS_2$-$TS_3$ and $TS_5$-$TS_n$ are not used by set 4. The physical channel assignment for set 4 is the entire S-CCPCH. The set 5 cells are assigned a fifth set of timeslots $TS_1$ and $TS_3$ in each of the frames. The remainder of the timeslots $TS_1$, and $TS_4$-$TS_n$ is not used by set 5. The physical channel assignment for set 5 is the entire S-CCPCH. The set 6 cells are assigned a sixth set of timeslots $TS_2$ and $TS_4$ in each of the frames. The remainder of the timeslots $TS_1$, $TS_3$ and $TS_5$-$TS_n$ are not used by set 6. The physical channel assignment for set 6 is the entire S-CCPCH. Timeslots for one or more of the sets overlap with timeslots from other sets. For example, timeslot $TS_1$ assigned to set 1 overlaps timeslots $TS_1$ assigned to set 4 and $TS_1$ assigned to set 5. Similarly timeslot $TS_2$ assigned to set 1 overlaps timeslot $TS_2$ assigned to set 3 and timeslot $TS_2$ assigned to set 6. There is no identical set of overlapping timeslots between any two sets of cells, so therefore each set of cells has its own unique combination of timeslots assigned to it.

During the timeslots, communications are allowed to overlap with the timeslots and frames assigned to multiple sets of cells. The combinations are such that there are no identical sets of overlapping timeslots or frames between any two sets of cells, giving each set of cells its own unique combination of timeslots and frames assigned to it.

Figure 5:
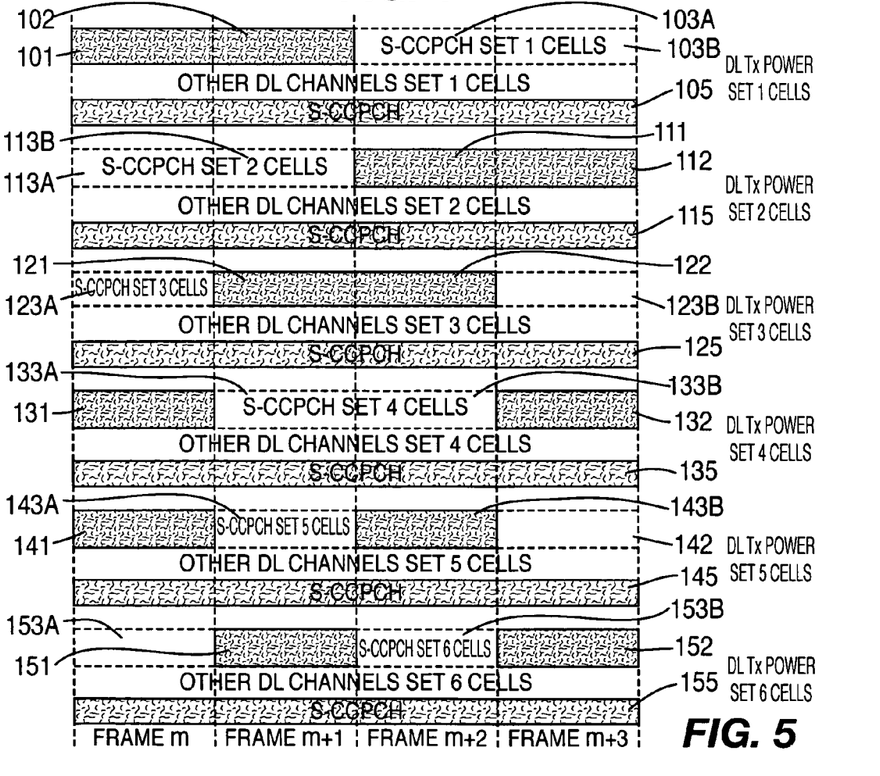
FIG. 5 shows an example of implementing time-domain reuse in an FDD system in which overlapping assignments are used according to the present invention.

FIG. 5 shows an example of implementing time-domain reuse in an FDD system in which the multi-frame allocations of a TDD system, as shown in FIG. 4, may be extended to FDD. FIG. 5 is a time-domain chart showing the frame allocations in which each set of cells within a predetermined group of sets of cells use the same S-CCPCH. The channel assignments depicted in FIG. 4 are limited to particular frames for each set of cells. However, the S-CCPCH for each set uses shared frames. This assignment applies to all sets of cells, but within the predetermined group of sets of cells, the cells in each set are assigned unique sets of S-CCPCHs. This modified technique is capable of overlapping frame assignments. This provides that within the predetermined group of sets of cells, the cells in each set are assigned unique sets of S-CCPCHs, and there is overlap between the sets of S-CCPCHs.

Referring to FIG. 5, the set 1 cells are assigned a first set of frames corresponding to frames 101 and 102. The remainder of the frames 103A and 103B are not used by set 1. The physical channel assignment 105 for set 1 is the entire S-CCPCH. The set 2 cells are assigned a second set of frames corresponding to frames 111 and 112. The remainder of the frames 113A and 113B are not used by set 2. The physical channel assignment 115 for set 2 is the entire S-CCPCH. The set 3 cells are assigned a third set of frames corresponding to frame 121 and frame 122. The remainder of the frames 123A and 123B are not used by set 3. The physical channel assignment 125 for set 3 is the entire S-CCPCH.

Referring still to FIG. 5, bringing in sets 4, 5 and 6 introduces the overlap of assignments. As can be seen in FIG. 5, the set 4 cells are assigned a fourth set of frames corresponding to frames 131 and 132. The remainder of the frames 133A and 133B are not used by set 4. The physical channel assignment 135 for set 4 is the entire S-CCPCH. The set 5 cells are assigned a fifth set of frames corresponding to frames 141 and 142. The remainder of the frames 143A and 143B are not used by set 5. The physical channel assignment 145 for set 5 is the entire S-CCPCH. The set 6 cells are assigned a sixth set of frames corresponding to frames 151 and 152. The remainder of the frames 153A and 153B are not used by set 6. The physical channel assignment 155 for set 6 is the entire S-CCPCH.

During the frames, communications are allowed to overlap with frames assigned to multiple sets of cells. The combinations are such that there are no identical sets of overlapping frames between any two sets of cells, giving each set of cells its own unique combination of frames assigned to it.

Referring to FIG. 5, FDD channel assignment for the cells in sets 1-4 allow for TTI=20 ms (achieved by setting up the S-CCPCH with the correct SFN). FDD generally allows for asynchronous cell operation and the use of asynchronous cell operation makes the inventive channel assignments in time easier to handle. Cells in set 5 and 6 need to use TTI=10 ms.

According to the present invention, a time-domain reuse factor is provided for FDD transmissions. The time-domain reuse factor is introduced for DL common channels, with special significance for the case of shared transmissions, such as MBMS on S-CCPCHs or DL shared channels. The principle is in analogy to time-domain use for TDD, but with continuous transmissions in a particular frame rather than a particular TS per frame, such as in TDD.

In FDD, because of a continuous transmission of S-CCPCH or downlink shared channel (DL DSCH) in a particular frame is required rather than a particular TS per frame like in TDD, a straightforward extension of the conventional process (equivalent to prior art for TDD) is not possible.

Even though an equivalent to multi-frame allocation like in TDD does not exist for FDD, the same can be achieved by allocating the channel continuously, i.e., every frame, but not sending it in some particular frames if not desired by the base station. The S-CCPCH does not need to contain pilot bits, because the P-CCPCH is usually taken as phase reference and that other control bits like TFCI need not be sent when no data is present. Therefore, nothing is unnecessarily transmitted in these idle periods. The use of the different channel assignments in association with the P-CCPCH channel assignments provides an equivalent of TDD technique used for FDD.

The present invention may be uses with voice as well as data using regular and High Speed Downlink Packet Access (HSDPA) transmissions according to the 3GPP W-CDMA communication system. The 3GPP system is used only as an example and the invention can be applied to other code division multiple access communication systems. It is also to be noted that the FDD part of the invention applies to the case of conventional S-CCPCHs or DL Shared Channels in UMTS FDD R99 and beyond (e.g., HS-DSCH in R5), independent of a specific content.

In accordance with the present invention, it is necessary to know when subscribers terminate the service or have successfully received the service in order to efficiently release physical and transport resources assigned to the MBMS. Subscriber generation of an explicate MBMS deactivation message can be used to reduce MBMS transmissions. This may either be an L3 RRC procedure or an NAS signaling procedure. Upon reception of the deactivation message, the MBMS context of the subscribers is removed from the current active subscribers associated with the particular MBMS.

Figure 6:
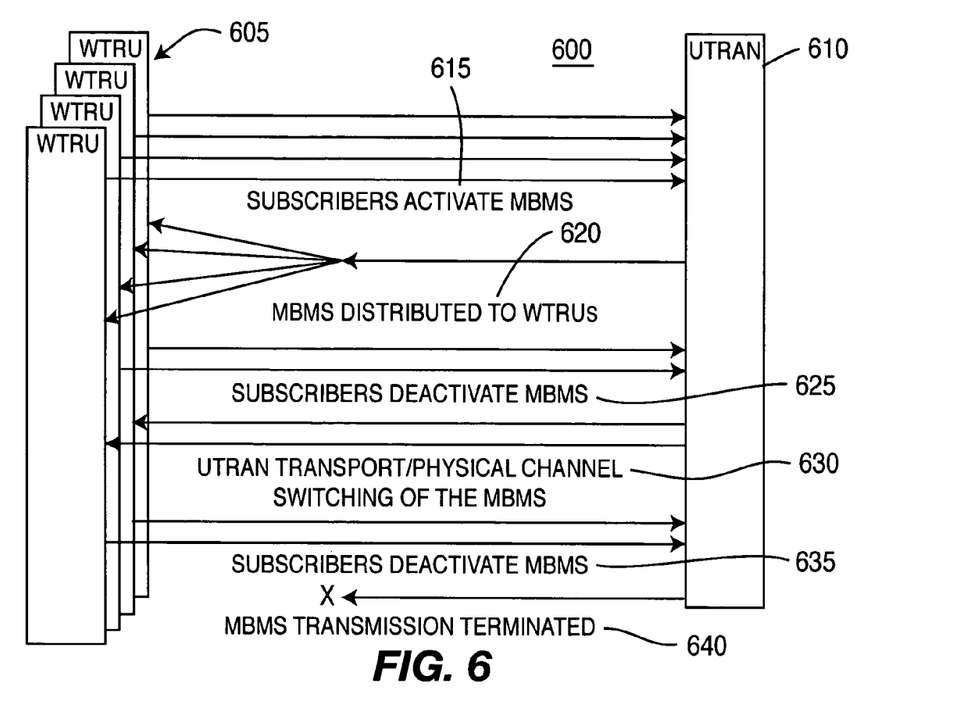
FIG. 6 is a block diagram of a communication system (either TDD or FDD) that implements MBMS service deactivation to control transport/physical channel switching and service termination according to one embodiment of the present invention.

Referring to FIG. 6, an activation/deactivation method is used in a wireless multi-cell communication system 600, including a plurality of WTRUs 605 which communicate with a UTRAN 610, in order to control the number of retransmissions necessary for particular MBMS.

The deactivation is used for transport switching to determine the current number of users (WTRUs) that are receiving the MBMS, such that the channels of the communication system 600 may be reconfigured for better performance. Furthermore, the number of retransmissions may be reduced.

In one embodiment, the WTRUs 605 of FIG. 6, operating in a specific one of the cells of the communication system 600, activate the MBMS. The UTRAN 610 determines the number of WTRUs 605 operating in the specific cell that activated the MBMS. The UTRAN 610 allocates resources to the specific cell based on the determined number of WTRUs 605. The UTRAN 610 distributes the MBMS to the WTRUs 605 using the allocated resources. The UTRAN 610 terminates the MBMS at the WTRUs 605 and reallocates the resources of the UTRAN 610 when all of the WTRUs 605 deactivate the MBMS.

Based on the number of active subscribers, UTRAN 610 configures transport and physical channels to achieve maximum radio resource efficiency. The MBMS deactivation signaling message is used as an explicate indication that reduces the subscriber count for each service to which the user is subscribed. When the number of subscribers of a particular service reaches a predetermined limit, the transport/physical channel switching is performed. When all subscribers have deactivated, the MBMS transmission is terminated in that cell.

In step 615, subscribers activate the MBMS by signaling UTRAN 610 with their WTRUs 605. The MBMS are distributed by the UTRAN 610 to the WTRUs 605 (step 620). As subscribers are removed from the active users for those MBMS (steps 625, 635), the UTRAN 610 may as a result either evoke MBMS transport/physical channel switching (step 630) or discontinue distribution of the service within that cell (step 640).

Figure 7:
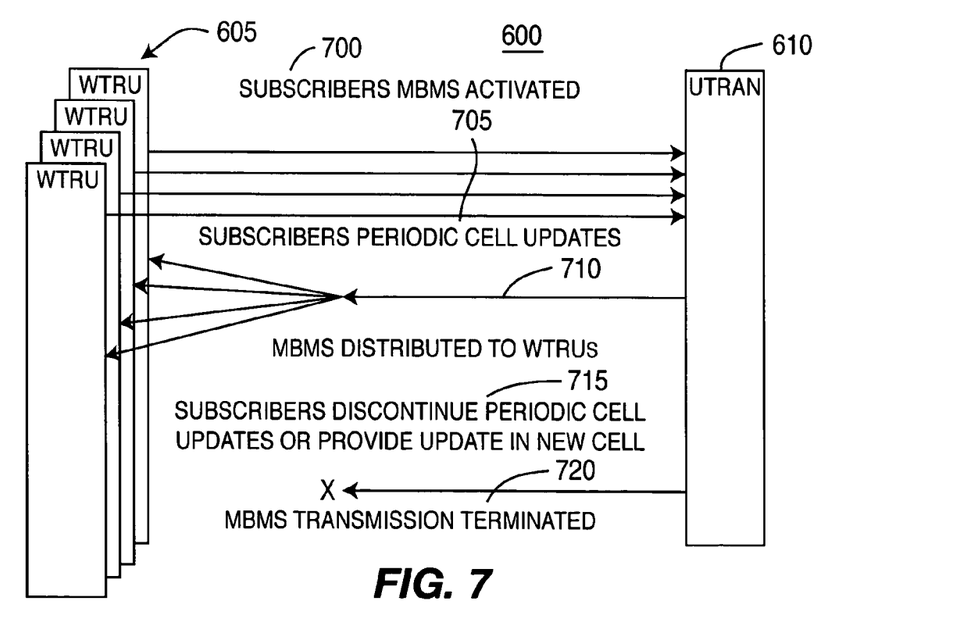
FIG. 7 is a block diagram of a communication system (either TDD or FDD) that implements a cell update procedure to control MBMS service transmission in according to one embodiment of the present invention.

Referring to FIG. 7, the existing cell update procedure may also used to activate and deactivate MBMS transmissions. The cell update procedure used to track subscriber mobility may also be configured for periodic updates. After the subscribers' MBMS are activated (step 700), and since the active MBMS users are known, the cell update procedure can be implemented on a periodic basis to determine when users have moved to a new cell or are not reachable by UTRAN 610 (step 705) such that MBMS may be distributed to WTRUs 605 (step 710). When the cell update procedure indicates that the WTRU 605 has moved to a new cell or that periodic updates about the subscribers are no longer being received by UTRAN 610 (step 715), the subscribers MBMS context is removed from the current active subscribers associated with the particular MBMS in that cell, thus causing the MBMS transmission to be terminated (step 720).

In one embodiment, at least one of the WTRUs 605 of FIG. 7 activates the MBMS. The WTRU 605 provides a periodic update to the network indicating a first one of the cells of the communication system that the WTRU 605 is operating in. The UTRAN 610 distributes the MBMS to the WTRU 605. The UTRAN 610 terminates the MBMS at the WTRU 605 when the WTRU 605 either ceases to provide the periodic update or operates in a cell of the communication system that is different than the first cell.

Figure 8:
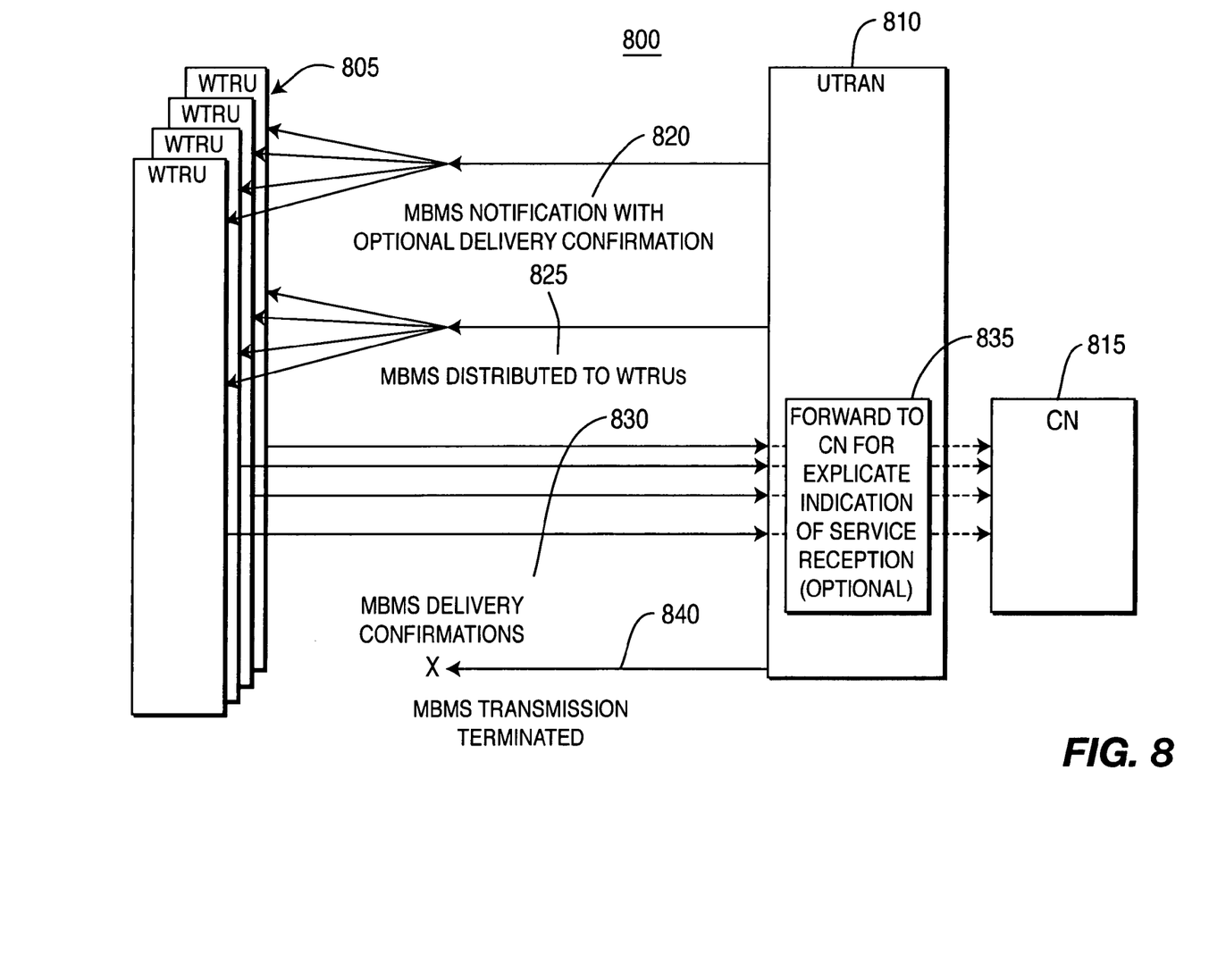
FIG. 8 is a block diagram of a communication system that implements delivery confirmations to reduce MBMS transmissions according to one embodiment of the present invention.

FIG. 8 shows a wireless communication system 800 including a plurality of WTRUs 805 which communicate with a UTRAN 810 and a core network (CN) 815. System 800 provides MBMS notification with optional delivery confirmation (step 820). After MBMS are distributed to the WTRUs 805 (step 825), further MBMS delivery confirmations reported by the WTRUs 805 to UTRAN 810 (step 830) can be propagated to the CN 815 for billing purposes (step 835). Signaling may be accomplished by either UTRAN 810 forwarding a confirmation message to WTRU 805, a generation of a new message by UTRAN 810, or direct Non-Access Stratum Node B Application Part (NAS) signaling from the WTRU 805 to the CN 815. Upon reception by the CN 815, delivery of the MBMS is recorded for each WTRU 805. The confirmation message may either be an L3 radio resource control (RRC) or NAS signaling message. The UTRAN 810 can track confirmations for each activated subscriber for those MBMS. Once all or a predetermined percentage of the active subscribers have confirmed delivery, the retransmissions can be terminated (step 840). A maximum retransmission count may also be configured to limit the use of radio resources for particular MBMS.

In one embodiment, the UTRAN 810 of FIG. 8 distributes the MBMS to at least one of the WTRUs 805 by transmitting a plurality of MBMS data transmissions. The WTRU 805 indicates to the UTRAN 810 that all of the MBMS data transmissions have been received. The UTRAN 810 then terminates the MBMS data transmissions.

Service confirmation may not always be justified. For example some services may have very little data per transmission. Therefore, the cost of retransmission is very small. One option to allow for this further optimization is to identify which services receive transmission confirmation during the activation procedure.

An additional method of achieving successful delivery of the MBMS with reduced retransmissions is to receive and store individual data segments from each transmission and then combine these blocks from each retransmission until the MBMS service transmission is complete. The MBMS transmission comprises several data segments, each of which contains one or more cyclic redundancy checks (CRCs) used to validate successful delivery.

Figure 9:
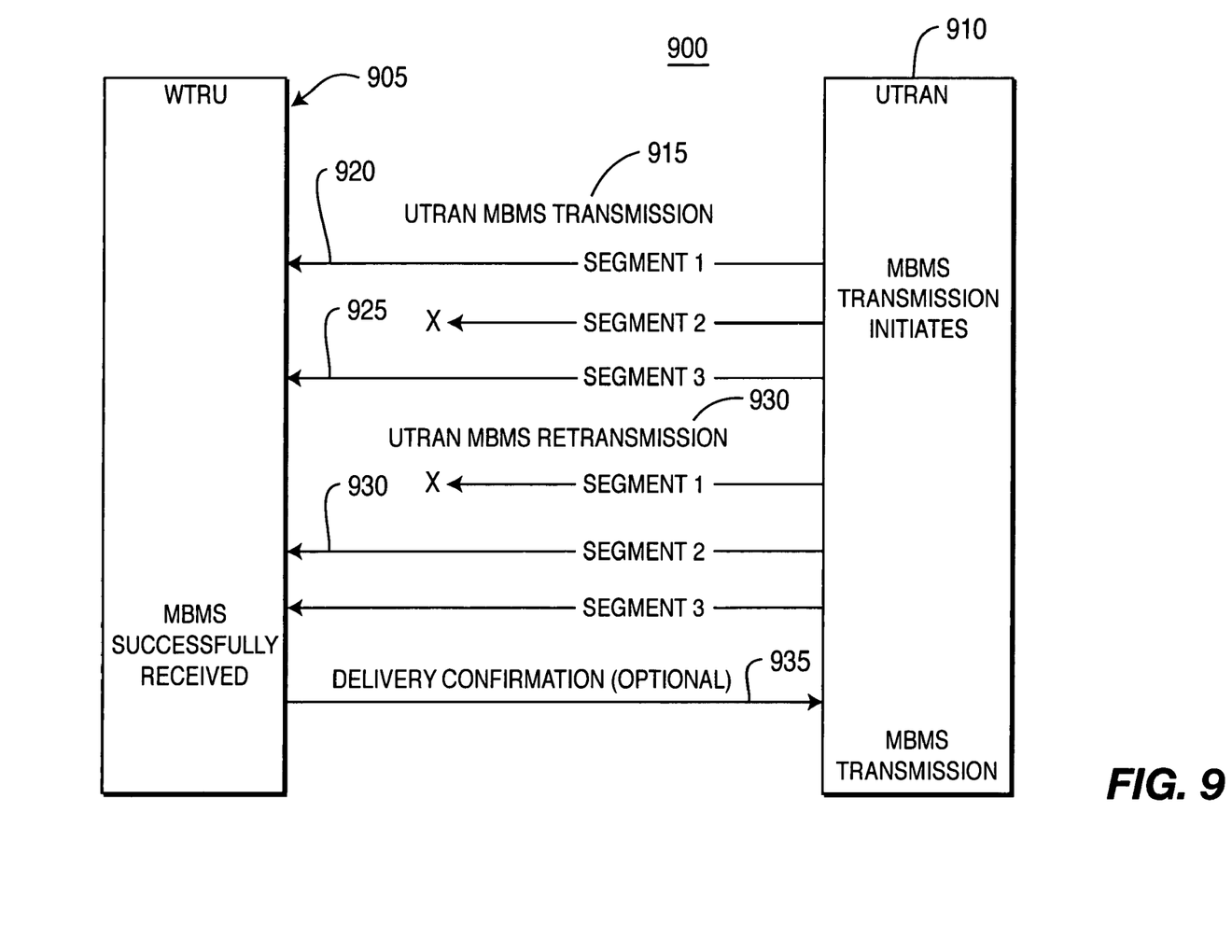
FIG. 9 is a block diagram of a system that implements MBMS segmentation according to one embodiment of the present invention.

MBMS segmentation is implemented by a wireless communication system 900 shown in FIG. 9. System 900 includes at least one WTRU 905 which communicates with a UTRAN 910. Upon reception of an MBMS transmission (step 915), the WTRU 905 stores all successfully received data segments (steps 920, 925). The WTRU 905 may use MBMS information to schedule reception of only those data segments that were not successfully received (e.g., segment 2) in previous transmissions (step 930), rather than receiving the entire transmission. Thus, WTRU processing and power consumption are reduced. Additionally, the number of required transmissions for successful delivery is reduced since it only necessary to schedule for reception those segments that have not been successfully received, rather than scheduling for reception the entire MBMS transmission. This MBMS segmentation can reduce the number of or terminate MBMS retransmissions either independent of, or with generation of, an optional MBMS delivery confirmation message by the subscriber (step 935).

In one embodiment, the UTRAN 910 of FIG. 9 segments the MBMS into a plurality of individual data segments and transmits each of the MBMS data segments to the WTRU 905. The WTRU 905 stores in a memory therein (not shown) each MBMS data segment that is properly received by the WTRU 905. The WTRU 905 identifies to the UTRAN 910 at least one MBMS data segment that was not properly received by the WTRU 905. The UTRAN 910 only retransmits the identified MBMS data segment to the WTRU 905.

Prior to transmitting the MBMS data segments, the UTRAN 910 may indicate to the WTRU 905 when each of the MBMS data segments is to be transmitted to the WTRU 905 and how many data segments the MBMS comprise. Each MBMS data segment may include at least one cyclic redundancy check (CRC) used to validate the successful delivery of the MBMS data segment by the WTRU 905. An operator of the UTRAN 910 may determine whether or not the WTRU 905 has received all of the data segments of the MBMS so as to facilitate billing.

In another embodiment, the UTRAN 910 segments the MBMS into a plurality of individual MBMS data segments scheduled to be transmitted at different times to the WTRU 905. The UTRAN 910 indicates to the WTRU 905 the different scheduled times and how many data segments the MBMS comprise. The UTRAN 910 transmits the MBMS data segments to the WTRU 905 at the different scheduled times. The WTRU 905 activates a receiver therein (not shown) at the different scheduled times to receive the MBMS data segments transmitted by the UTRAN 910. The WTRU 905 identifies to the UTRAN 910 at least one MBMS data segment that was not properly received by the WTRU 905. The UTRAN 910 indicates to the WTRU 905 an allocated time when the identified data segment is to be retransmitted to the WTRU 905. The UTRAN 910 only retransmits the identified MBMS data segment to the WTRU. The WTRU 905 activates the receiver therein at the allocated time to receive the retransmitted MBMS data segment.

While this invention has been particularly shown and described with reference to preferred embodiments, it will be understood by those skilled in the art that various changes in form and details may be made therein without departing from the scope of the invention as described above.

What is claimed is:

1. A method of providing multimedia broadcast services (MBMS), the method comprising:
   organizing a plurality of wireless communication cells into a plurality of cell sets, each cell set having at least one cell;
   determining whether or not to use multi-frame allocations; and
   when it is determined not to use multi-frame allocations, providing different combinations of timeslots for each cell set, wherein the different combinations of timeslots are not provided when it is determined to use multi-frame allocations.

2. The method of claim 1 further comprising: allocating assigned resource units in each cell for MBMS transmission.

3. The method of claim 2 further comprising:
   providing information indicating how to access the resource units allocated for MBMS transmission.

4. The method of claim 3 further comprising:
   determining whether current MBMS requirements are fulfilled with respect to previously established MBMS requirements.

5. The method of claim 1 wherein combinations of time slots are reused.

6. The method of claim 5 wherein the reusing of combinations of time slots is based on time slot repetition periods.

7. The method of claim 6 wherein a time-domain reuse factor of 3 is used.

8. A wireless communication apparatus configured to provide multimedia broadcast services (MBMS), the wireless communication apparatus configured to:
   organize a plurality of wireless communication cells into a plurality of cell sets, each cell having at least one cell;
   determine whether or not to use multi-frame allocations; and
   provide different combinations of timeslots for each cell set when it is determined not to use multi-frame allocations, wherein different combinations of timeslots are not provided when it is determined to use multi-frame allocations.

9. The apparatus of claim 8 further configured to:
   allocate assigned resource units in each cell for MBMS transmission.

10. The apparatus of claim 9 further configured to:
    provide information indicating how to access the resource units allocated for MBMS transmission.

11. The apparatus of claim 10 farther configured to:
    determine whether current MBMS requirements are fulfilled with respect to previously established MBMS requirements.

12. The apparatus of claim 8 wherein combinations of time slots are reused.

13. The apparatus of claim 12 wherein the reusing of combinations of time slots is based on time slot repetition periods.

14. The apparatus of claim 13 wherein a time-domain reuse factor of 3 is used.

* * * * *

UNITED STATES PATENT AND TRADEMARK OFFICE
CERTIFICATE OF CORRECTION

PATENT NO. : 7,586,874 B2
APPLICATION NO. : 10/740259
DATED : September 8, 2009
INVENTOR(S) : Rudolf et al.

It is certified that error appears in the above-identified patent and that said Letters Patent is hereby corrected as shown below:

IN THE SPECIFICATION

At column 2, line 51, after the word "created" delete "to" and insert --in--.

At column 3, line 8, before the words "cells in" delete "sets in".

At column 3, line 39, before the words "not used" delete "is" and insert therefor --are--.

At column 4, line 14, after the word "techniques" insert --to--.

At column 4, line 27, after the word "retransmissions" delete "complete" and insert therefor --are completed--.

At column 5, line 49, before the word "according" delete "in".

At column 6, line 63, before the words "and are" delete "change" and insert therefor --changed--.

At column 7, line 25, before the words "and beyond" delete "option" and insert therefor --options--.

At column 7, line 50, after the word "can" delete "is" and insert therefor --be--.

At column 9, line 67, before the words "not used" delete "is" and insert therefor --are--.

At column 11, line 31, after the words "may be" delete "uses" and insert therefor --used--.

At column 11, line 54, before the word "particular" insert --a--.

At column 12, line 22, before the word "used" insert --be--.

At column 12, line 32, before "MBMS" delete "subscribers" and insert therefor --subscriber's--.

At column 13, line 29, after the words "since it" insert --is--.

CERTIFICATE OF CORRECTION (continued)
U.S. Pat. No. 7,586,874 B2

IN THE CLAIMS

At claim 8, column 14, line 46, after the word "wherein" insert --the--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO.       : 7,586,874 B2                              Page 1 of 1
APPLICATION NO.  : 10/740259
DATED            : September 8, 2009
INVENTOR(S)      : Rudolf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this

Twenty-first Day of September, 2010

David J. Kappos
*Director of the United States Patent and Trademark Office*